US010216732B2

(12) United States Patent
Miura et al.

(10) Patent No.: US 10,216,732 B2
(45) Date of Patent: Feb. 26, 2019

(54) INFORMATION PRESENTATION METHOD, NON-TRANSITORY RECORDING MEDIUM STORING THEREON COMPUTER PROGRAM, AND INFORMATION PRESENTATION SYSTEM

(71) Applicant: Panasonic Intellectual Property Management Co., Ltd., Osaka (JP)

(72) Inventors: Koji Miura, Osaka (JP); Masakatsu Hoshimi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/641,319

(22) Filed: Jul. 5, 2017

(65) Prior Publication Data
US 2018/0067928 A1 Mar. 8, 2018

(30) Foreign Application Priority Data

Sep. 7, 2016 (JP) ................................. 2016-174367
Apr. 7, 2017 (JP) ................................. 2017-076693

(51) Int. Cl.
*G06F 17/28* (2006.01)
*G10L 15/26* (2006.01)
(Continued)

(52) U.S. Cl.
CPC ............ *G06F 17/289* (2013.01); *G10L 13/00* (2013.01); *G10L 13/08* (2013.01); *G10L 15/26* (2013.01)

(58) Field of Classification Search
CPC ..................................................... G06F 17/289
(Continued)

(56) References Cited

U.S. PATENT DOCUMENTS 6,725,199 B2 *  4/2004  Brittan .................. G10L 13/047
                                                            704/258
7,062,439 B2 *  6/2006  Brittan .................. G10L 13/027
                                                            704/220

(Continued)

FOREIGN PATENT DOCUMENTS

JP          2013-073355          4/2013

*Primary Examiner* — Susan I McFadden
(74) *Attorney, Agent, or Firm* — Greenblum & Bernstein, P.L.C.

(57) ABSTRACT

An information presentation method, a non-transitory recording medium storing thereon a computer program, and an information presentation system relate to speech recognition. A speech recognition unit performs speech recognition on speech pertaining to a dialogue and thereby generates dialogue text, a translation unit translates the dialogue text and thereby generates translated dialogue text, and a speech waveform synthesis unit performs speech synthesis on the translated dialogue text and thereby generates translated dialogue speech. An intention understanding unit then determines whether supplementary information exists, based on the dialogue text. If supplementary information exists, a communication unit transmits the supplementary information and the translated dialogue speech to a terminal to present the existence of the supplementary information to at least one person from among a plurality of people, according to the usage situation of the information presentation system of the at least one person.

9 Claims, 8 Drawing Sheets

(51) Int. Cl.
*G10L 13/08* (2013.01)
*G10L 13/00* (2006.01)
(58) Field of Classification Search
USPC .............................................. 704/3
See application file for complete search history.

(56) References Cited

U.S. PATENT DOCUMENTS 7,062,440 B2 * 6/2006 Brittan .................... G10L 15/22
704/266
7,191,132 B2 * 3/2007 Brittan .................... G10L 13/08
704/259

* cited by examiner

FIG. 3

| 301 | 302 |
|---|---|
| EXPLANATION ID | SUPPORTING INFORMATION EXPLANATION |
| 0000001 | I'll show you the map |
| 0000002 | I'll show you the information |
| 0000003 | I'll show you the movie |

FIG. 4

| 401 | 402 | 403 | 404 | 405 |
|---|---|---|---|---|
| ENTITY | CONTENT ID | INTENTION ID | EXPLANATION ID | CONTENT INFORMATION |
| Tokyo Skytree | 12345678 | 0001 | 00000001 | http://foo.jp/map?id=12345678 |
| Tokyo Skytree | 12345678 | 0002 | 00000002 | http://foo.jp/whatis?id=12345678 |
| Train Ticket | 12345670 | 0002 | 00000003 | http://foo.jp/howto?id=12345670 |

INFORMATION PRESENTATION METHOD, NON-TRANSITORY RECORDING MEDIUM STORING THEREON COMPUTER PROGRAM, AND INFORMATION PRESENTATION SYSTEM

BACKGROUND

1. Technical Field

The present disclosure relates to an information presentation method, a non-transitory recording medium storing thereon a computer program, and an information presentation system with which speech pertaining to a dialogue between a plurality of people is translated and supplementary information for supporting the dialogue is presented.

2. Description of the Related Art

There is a conventionally known technology of a dialogue support device that supports a dialogue between a plurality of people, in which information for supplementing knowledge is presented according to the content of the dialogue to support the dialogue (see Japanese Unexamined Patent Application Publication No. 2013-73355, for example).

SUMMARY

However, further improvement was required in the aforementioned Japanese Unexamined Patent Application Publication No. 2013-73355.

In one general aspect, the techniques disclosed here feature an information presentation method in an information presentation system, the information presentation method including: performing speech recognition on speech pertaining to a dialogue between a plurality of people and thereby generating dialogue text, using a processor of the information presentation system; translating the dialogue text and thereby generating translated dialogue text, using the processor; performing speech synthesis on the translated dialogue text and thereby generating translated dialogue speech, using the processor; outputting the translated dialogue speech from a speaker of the information presentation system; determining whether or not supplementary information for supporting the dialogue exists, based on the dialogue text; and in the case where the supplementary information exists, presenting that the supplementary information exists, to at least one person from among the plurality of people, on a display of the information presentation system, in accordance with the usage situation of the information presentation system of the at least one person from among the plurality of people.

According to the aforementioned aspect, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a drawing depicting an example of information stored in a supporting explanation storage unit;

FIG. 4 is a drawing depicting an example of information stored in a supplementary information storage unit;

Figure 1:
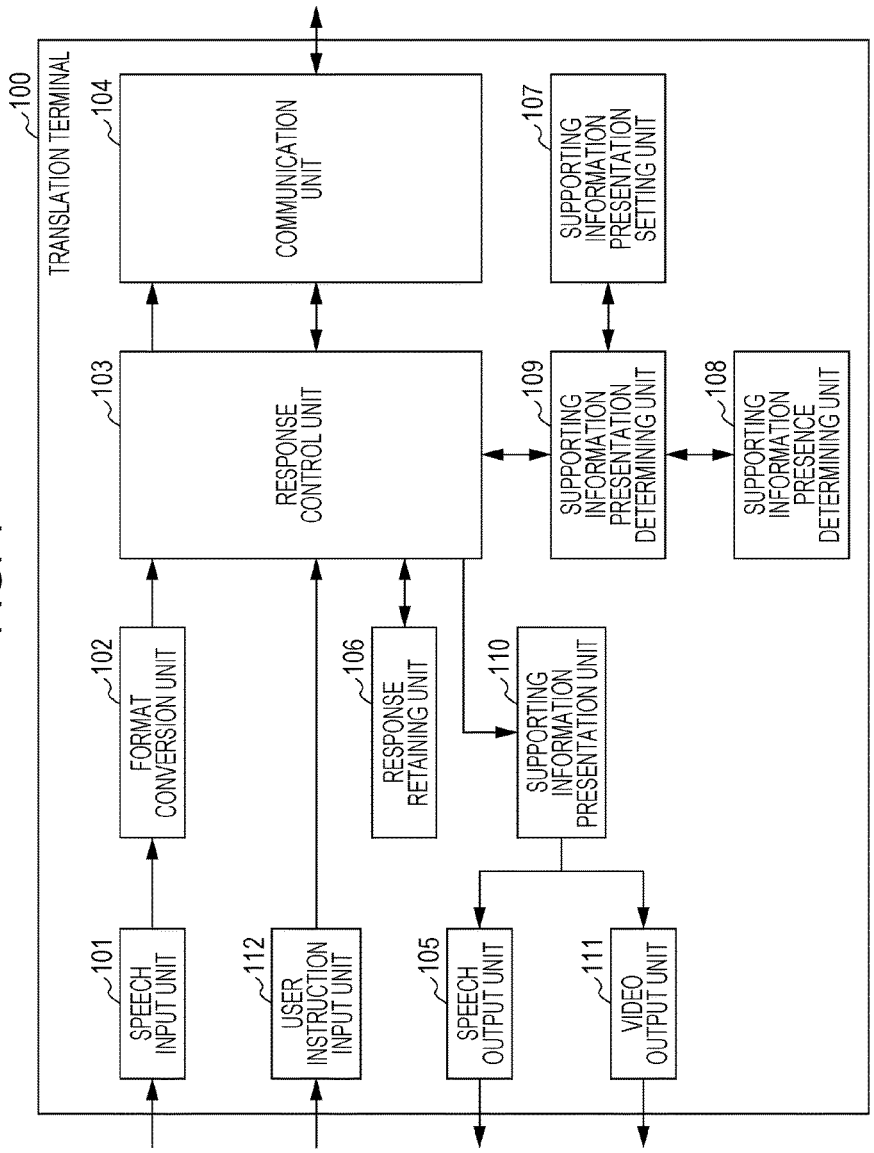
FIG. 1 is a block diagram depicting a configuration of a translation terminal of an information presentation system of the present embodiment.

DETAILED DESCRIPTION (Underlying Knowledge Forming Basis of Aspect According to Present Disclosure)

First, a description will be given regarding the essential points of an aspect according to the present disclosure.

The aforementioned Japanese Unexamined Patent Application Publication No. 2013-73355 discloses a technology for displaying supplementary information on the basis of an utterance action tag that indicates an utterance action and a person tag that indicates a person. "Greeting", "response", "question", and the like are given as utterance action tags (see FIG. 8 in Japanese Unexamined Patent Application Publication No. 2013-73355). Furthermore, as for the timing for displaying the supplementary information, a method is given for deciding the necessity for presenting information or the timing for presenting information, in accordance with the combination of a person and an utterance action (see FIG. 10 in Japanese Unexamined Patent Application Publication No. 2013-73355).

In this way, in Japanese Unexamined Patent Application Publication No. 2013-73355, the necessity for presenting information and the timing for presenting information can be controlled based on the utterance action and the person. However, the necessity for presenting information and the timing for presenting information are decided by a dialogue support device, and are not decided by a customer or a customer attendant.

In this way, in the case where the dialogue support device decides the necessity for presenting information and the timing for presenting information, it is not possible to meet the requirements of a customer attendant who wishes to leave out the presentation of supplementary information due to the customer being in a hurry. Furthermore, with the conventional dialogue support device, supplementary information is notified even in the case where it is not necessary for the supplementary information to be presented due to the customer attendant handling the dialogue support device possessing sufficient knowledge.

Furthermore, in Japanese Unexamined Patent Application Publication No. 2013-73355, methods are given for producing a sound, causing a display to flash, causing a device to vibrate, or the like as methods for notifying a user of the presentation of supplementary information. However, with these methods, there is a risk of hindering customer service tasks that predominantly take the form of a dialogue, and it is not possible to notify that there is supplementary information in a natural manner during a dialogue.

In order to solve the aforementioned problems, an information presentation method according to an aspect of the present disclosure is an information presentation method in an information presentation system, the information presentation method including: performing speech recognition on speech pertaining to a dialogue between a plurality of people and thereby generating dialogue text, using a processor of the information presentation system; translating the dialogue text and thereby generating translated dialogue text, using the processor; performing speech synthesis on the translated dialogue text and thereby generating translated dialogue speech, using the processor; outputting the translated dialogue speech from a speaker of the information presentation system; determining whether or not supplementary information for supporting the dialogue exists, based on the dialogue text; and in the case where the supplementary information exists, presenting that the supplementary information exists, to at least one person from among the plurality of people, on a display of the information presentation system, in accordance with the usage situation of the information presentation system of the at least one person from among the plurality of people.

According to this configuration, speech recognition is performed on speech pertaining to a dialogue between a plurality of people and dialogue text is thereby generated, using a processor of the information presentation system. The dialogue text is translated and translated dialogue text is thereby generated, using the processor. Speech synthesis is performed on the translated dialogue text and translated dialogue speech is thereby generated, using the processor. The translated dialogue speech is output from a speaker of the information presentation system. Whether or not supplementary information for supporting the dialogue exists is determined based on the dialogue text. In the case where the supplementary information exists, the existence of the supplementary information is presented to at least one person from among the plurality of people, on a display of the information presentation system, in accordance with the usage situation of the information presentation system of the at least one person from among the plurality of people.

Consequently, the existence of the supplementary information for supporting the dialogue is presented prior to the supplementary information being presented. Therefore, the supplementary information can be presented only when a person requires the supplementary information to be presented rather than the supplementary information always being presented, and a smooth dialogue can be realized.

Furthermore, in the aforementioned information presentation method, a presentation instruction for the supplementary information may be received from the at least one person from among the plurality of people, and the supplementary information may be presented in accordance with the received presentation instruction.

According to this configuration, a presentation instruction for the supplementary information is received from the at least one person from among the plurality of people, and the supplementary information is presented in accordance with the received presentation instruction.

Consequently, the supplementary information can be presented to a person who requires the supplementary information to be presented.

Furthermore, in the aforementioned information presentation method, the translated dialogue speech may be generated by performing speech waveform synthesis on the translated dialogue text, explanatory text that explains the supplementary information may be specified from the dialogue text, and supplementary information speech may be generated by performing speech analysis and synthesis on the explanatory text.

According to this configuration, translated dialogue speech is generated by performing speech waveform synthesis on the translated dialogue text. Explanatory text that explains the supplementary information is specified from the dialogue text. Supplementary information speech is generated by performing speech analysis and synthesis on the explanatory text.

Consequently, supplementary information speech is generated by performing speech analysis and synthesis on the explanatory text that explains the supplementary information, and therefore the supplementary information can be presented by means of speech.

Furthermore, in the aforementioned information presentation method, the fundamental frequency of the supplementary information speech may be different from the fundamental frequency of the translated dialogue speech.

According to this configuration, the fundamental frequency of the supplementary information speech is different from the fundamental frequency of the translated dialogue speech, and therefore a person can differentiate between speech obtained by translating an utterance and speech of the supplementary information presented from the information presentation system.

Furthermore, in the aforementioned information presentation method, first speech of a first person who asks a question in a first language may be acquired, and second speech of a second person who responds to the question in a second language that is different from the first language may also be acquired, first dialogue text may be generated by performing speech recognition on the first speech, first translated dialogue text may be generated by translating the first dialogue text into the second language, first translated dialogue speech may be generated by performing speech synthesis on the first translated dialogue text, second dialogue text may be generated by performing speech recognition on the second speech, second translated dialogue text may be generated by translating the second dialogue text into the first language, second translated dialogue speech may be generated by performing speech synthesis on the second translated dialogue text, whether or not the supplementary information exists may be determined based on at least one of the first dialogue text and the second dialogue text, and in the case where the supplementary information exists, the existence of the supplementary information may be presented to at least one of the first person and the second person in accordance with the usage situation of the information presentation system of the second person.

According to this configuration, first speech of a first person who asks a question in a first language is acquired, and also second speech of a second person who responds to the question in a second language that is different from the first language is acquired. First dialogue text is generated by performing speech recognition on the first speech. First translated dialogue text is generated by translating the first dialogue text into the second language. First translated dialogue speech is generated by performing speech synthesis on the first translated dialogue text. Second dialogue text is generated by performing speech recognition on the second speech. Second translated dialogue text is generated by translating the second dialogue text into the first language. Second translated dialogue speech is generated by performing speech synthesis on the second translated dialogue text.

Whether or not the supplementary information exists is determined based on at least one of the first dialogue text and the second dialogue text. In the case where the supplementary information exists, the existence of the supplementary information is presented to at least one of the first person and the second person in accordance with the usage situation of the information presentation system of the second person.

Consequently, when the first person asks a question in the first language and the second person responds in the second language, the supplementary information can be presented only when the second person requires the supplementary information to be presented, and a smooth dialogue can be realized.

Furthermore, in the aforementioned information presentation method, the usage situation may include the number of times of having translated into the first language, in the case where the supplementary information exists, it may be determined whether or not the number of times of having translated into the first language is greater than a predetermined number of times, and in the case where it is determined that the number of times of having translated into the first language is greater than the predetermined number of times, the existence of the supplementary information may not be presented to the second person.

According to this configuration, the usage situation includes the number of times of having translated into the first language. In the case where the supplementary information exists, it is determined whether or not the number of times of having translated into the first language is greater than a predetermined number of times. In the case where it is determined that the number of times of having translated into the first language is greater than the predetermined number of times, the existence of the supplementary information is not presented to the second person.

Consequently, in the case where the number of times of having translated into the first language is greater than the predetermined number of times, it can be estimated that the supplementary information is information that is already known to the second person, and therefore it is not necessary for the existence of the supplementary information to be presented, and processing for presenting unnecessary information can be omitted.

Furthermore, in the aforementioned information presentation method, the usage situation may include a usage time from the second person starting to use the information presentation system to the present time, in the case where the supplementary information exists, it may be determined whether or not the usage time is longer than a predetermined time, and in the case where it is determined that the usage time is longer than the predetermined time, the existence of the supplementary information may not be presented to the second person.

According to this configuration, the usage situation includes a usage time from the second person starting to use the information presentation system to the present time. In the case where the supplementary information exists, it is determined whether or not the usage time is longer than a predetermined time. In the case where it is determined that the usage time is longer than the predetermined time, the existence of the supplementary information is not presented to the second person.

Consequently, in the case where the usage time of the information presentation system by the second person is longer than the predetermined time, it can be estimated that the supplementary information is information that is already known to the second person, and therefore it is not necessary for the existence of the supplementary information to be presented, and processing for presenting unnecessary information can be omitted.

Furthermore, in the aforementioned information presentation method, the supplementary information may include information explaining an explanation subject, the usage situation may include the number of times of having presented the supplementary information corresponding to the same explanation subject, in the case where the supplementary information exists, it may be determined whether or not the number of times of having presented the supplementary information is greater than a predetermined number of times, and in a case where it is determined that the number of times of having presented the supplementary information is greater than the predetermined number of times, the existence of the supplementary information may not be presented to the second person.

According to this configuration, the supplementary information includes information explaining an explanation subject. The usage situation includes the number of times of having presented the supplementary information corresponding to the same explanation subject. In the case where the supplementary information exists, it is determined whether or not the number of times of having presented the supplementary information is greater than a predetermined number of times. In the case where it is determined that the number of times of having presented the supplementary information is greater than the predetermined number of times, the existence of the supplementary information is not presented to the second person.

Consequently, in the case where the number of times of having presented the supplementary information corresponding to the same explanation subject is greater than the predetermined number of times, it can be estimated that the supplementary information is information that is already known to the second person, and therefore it is not necessary for the existence of the supplementary information to be presented, and processing for presenting unnecessary information can be omitted.

According to another aspect of the present disclosure, a non-transitory recording medium stores thereon a computer program, which when executed by a processor, causes the processor to perform operations including: performing speech recognition on speech pertaining to a dialogue between a plurality of people and thereby generating dialogue text; translating the dialogue text and thereby generating translated dialogue text; performing speech synthesis on the translated dialogue text and thereby generating translated dialogue speech; determining whether or not supplementary information for supporting the dialogue exists, based on the dialogue text; and in the case where it is determined that the supplementary information exists, transmitting the supplementary information and the translated dialogue speech to a terminal of at least one person from among the plurality of people, in accordance with the usage situation of the terminal.

According to this configuration, speech recognition is performed on speech pertaining to a dialogue between a plurality of people and dialogue text is thereby generated. The dialogue text is translated and translated dialogue text is thereby generated. Speech synthesis is performed on the translated dialogue text and translated dialogue speech is thereby generated. Whether or not supplementary information for supporting the dialogue exists is determined based on the dialogue text. In the case where it is determined that the supplementary information exists, the supplementary information and the translated dialogue speech are transmitted to a terminal of at least one person from among the plurality of people, in accordance with the usage situation of the terminal.

Consequently, the existence of the supplementary information for supporting the dialogue is presented prior to the supplementary information being presented. Therefore, the supplementary information can be presented only when a person requires the supplementary information to be presented rather than the supplementary information always being presented, and a smooth dialogue can be realized.

An information presentation system according to another aspect of the present disclosure is provided with: a terminal; and a server that is connected to the terminal via the Internet, in which the terminal is provided with: a speaker a display; a first processor; and a first memory storing thereon a first computer program, which when executed by the first processor, causes the first processor to perform first operations including: acquiring speech pertaining to a dialogue between a plurality of people; and transmitting the acquired speech to the server, and in which the server is provided with: a second processor; and a second memory storing thereon a second computer program, which when executed by the second processor, causes the second processor to perform second operations including: receiving the speech; performing speech recognition on the speech pertaining to the dialogue and thereby generating dialogue text; translating the dialogue text and thereby generating translated dialogue text; performing speech synthesis on the translated dialogue text and thereby generating translated dialogue speech; determining whether or not supplementary information for supporting the dialogue exists, based on the dialogue text; and in the case where it is determined that the supplementary information exists, transmitting the supplementary information and the translated dialogue speech to the terminal of at least one person from among the plurality of people, in accordance with the usage situation of the terminal, the first operations further including: receiving the supplementary information and the translated dialogue speech; outputting the translated dialogue speech from the speaker; and presenting that the supplementary information exists, to the at least one person from among the plurality of people, on a display of the terminal.

According to this configuration, in a terminal, speech pertaining to a dialogue between a plurality of people is acquired. The acquired speech is transmitted to a server. In the server, the speech is received. Speech recognition is performed on the speech pertaining to the dialogue and dialogue text is thereby generated. The dialogue text is translated and translated dialogue text is thereby generated. Speech synthesis is performed on the translated dialogue text and translated dialogue speech is thereby generated. Whether or not supplementary information for supporting the dialogue exists is determined based on the dialogue text. In the case where it is determined that the supplementary information exists, the supplementary information and the translated dialogue speech are transmitted to the terminal of at least one person from among the plurality of people, in accordance with the usage situation of the terminal. In the terminal, the supplementary information and the translated dialogue speech are received. The translated dialogue speech is output from a speaker. The existence of the supplementary information is presented to the at least one person from among the plurality of people, on a display of the terminal.

Consequently, the existence of the supplementary information for supporting the dialogue is presented prior to the supplementary information being presented. Therefore, the supplementary information can be presented only when a person requires the supplementary information to be presented rather than the supplementary information always being presented, and a smooth dialogue can be realized.

(Embodiments)

Hereinafter, embodiments of the present disclosure will be described with reference to the drawings. It should be noted that, in the drawings, the same reference symbols are used for the same constituent elements. Furthermore, the embodiments hereinafter are exemplary embodiments of the present disclosure, and do not limit the technical scope of the present disclosure.

FIG. 1 is a block diagram depicting a configuration of a translation terminal of an information presentation system of the present embodiment.

The information presentation system translates speech pertaining to a dialogue between a plurality of people, and presents supplementary information for supporting the dialogue. The information presentation system is provided with a translation terminal 100 and a translation server 200. The translation terminal 100 and the translation server 200 are communicably connected to each other via a network.

The translation terminal 100 may be a tablet-type computer, a smartphone, a cellular phone, or a notebook-type personal computer (PC), for example. Furthermore, the translation terminal 100 may be a dedicated terminal for translating speech pertaining to a dialogue between a plurality of people.

As depicted in FIG. 1, the translation terminal 100 of the information presentation system of the present embodiment is provided with a speech input unit 101, a format conversion unit 102, a response control unit 103, a communication unit 104, a speech output unit 105, a response retaining unit 106, a supplementary information presentation setting unit 107, a supplementary information presence determining unit 108, a supplementary information presentation determining unit 109, a supplementary information presentation unit 110, a video output unit 111, and a user instruction input unit 112.

The speech input unit 101 collects speech of a customer who speaks a language other than Japanese such as a foreign visitor to Japan, or a salesperson who speaks Japanese, and generates an analog speech signal. The speech input unit 101 acquires speech signals obtained from utterances of a plurality of people who are engaged in a dialogue.

The format conversion unit 102 converts the analog speech signal generated by the speech input unit 101 into digital data by means of pulse-code modulation (PCM), for example, and generates a PCM speech signal.

The response control unit 103 determines the person who uttered speech that has been input from the speech input unit 101. Furthermore, the response control unit 103 transmits, to the translation server 200, the PCM speech signal generated by the format conversion unit 102 and the result of translating an utterance of the customer retained in the response retaining unit 106. Furthermore, the response control unit 103 receives, from the translation server 200, a translation result and content information relating to supplementary information. Furthermore, the response control unit 103 outputs the translation result received from the translation server 200, as speech via the speech output unit 105. Furthermore, the response control unit 103 acquires supplementary information, and controls presentation of the acquired supplementary information in accordance with an instruction of the salesperson that has been input from the user instruction input unit 112.

The communication unit 104 communicates data with the translation server 200 via a communication line such as the Internet. The communication unit 104 transmits the speech pertaining to the dialogue between the plurality of people to the translation server 200. The communication unit 104 receives, from the translation server 200, the result of translating an utterance of the customer, the result of translating an utterance of the salesperson, and supplementary information corresponding to the utterance of the salesperson and the utterance of the customer.

The speech output unit 105 outputs, as speech, the result of translating the utterance of the customer, the result of translating the utterance of the salesperson, and the supplementary information corresponding to the utterance of the salesperson and the utterance of the customer received from the translation server 200.

The response retaining unit 106 is a nonvolatile memory, for example, and retains the result of translating the utterance of the customer received from the translation server 200.

The supplementary information presentation setting unit 107 sets whether or not the supplementary information is to be displayed, and also stores set presentation necessity information indicating whether or not the supplementary information is to be presented. The salesperson is able to preset whether or not the supplementary information is to be presented, via a user interface such as a supplementary information presentation setting screen. That is, as a result of the supplementary information presentation setting unit 107 setting presentation necessity information indicating that the supplementary information is not to be presented, the salesperson can carry out a customer service task using a translation function without the interruption of supplementary information.

The supplementary information presence determining unit 108 determines whether or not supplementary information corresponding to the utterance of the salesperson and the utterance of the customer exists.

The supplementary information presentation determining unit 109 determines whether or not the supplementary information is to be presented, on the basis of the setting content of the supplementary information presentation setting unit 107, the determination result of the supplementary information presence determining unit 108, and the user instruction content that has been input from the user instruction input unit 112.

The supplementary information presentation unit 110 presents the supplementary information corresponding to the utterance of the salesperson and the utterance of the customer via the speech output unit 105 and the video output unit 111.

The video output unit 111 displays the supplementary information (content information) corresponding to the utterance of the salesperson and the utterance of the customer.

The user instruction input unit 112 provides a user interface for instructing the supplementary information to be presented.

Figure 2:
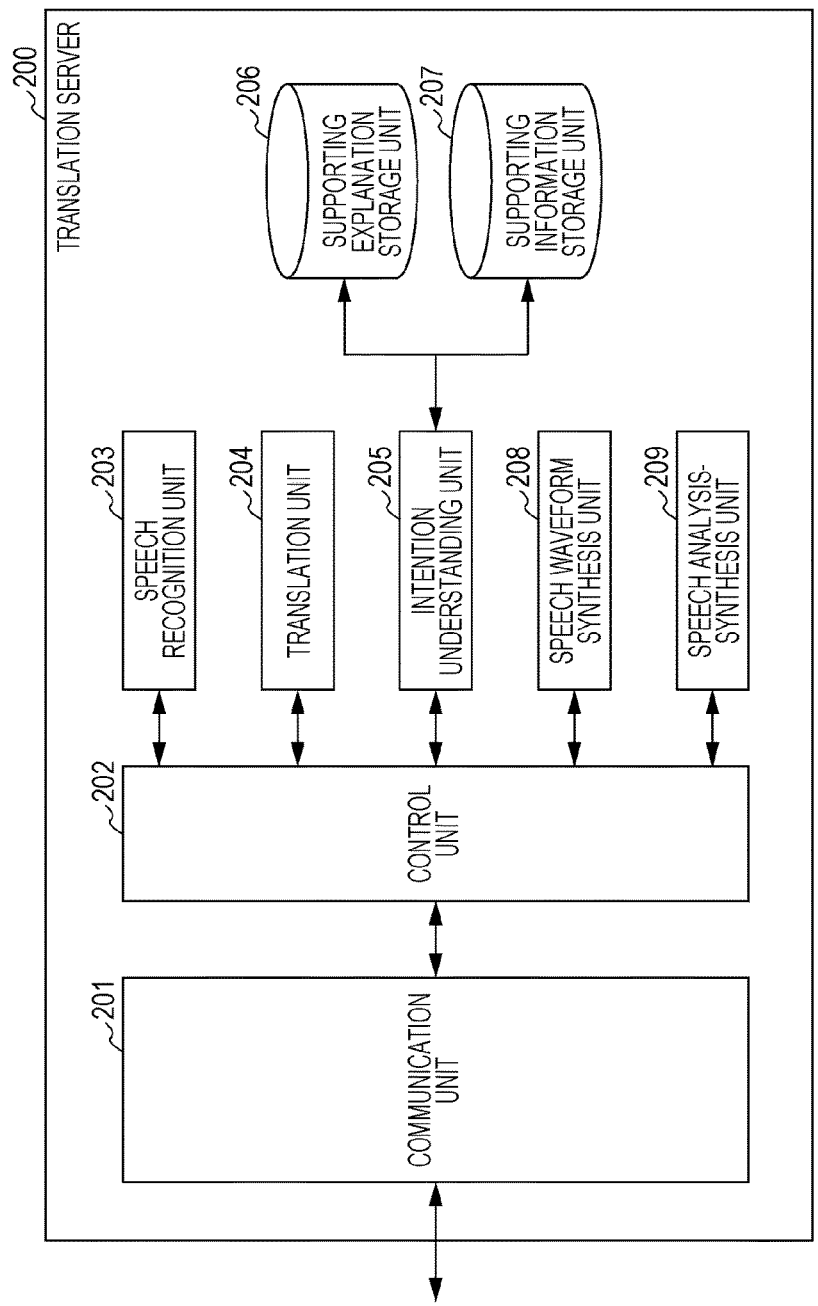
FIG. 2 is a block diagram depicting a configuration of a translation server of the information presentation system of the present embodiment.

FIG. 2 is a block diagram depicting a configuration of the translation server of the information presentation system of the present embodiment.

As depicted in FIG. 2, the translation server 200 of the information presentation system of the present embodiment is provided with a communication unit 201, a control unit 202, a speech recognition unit 203, a translation unit 204, an intention understanding unit 205, a supporting explanation storage unit 206, a supplementary information storage unit 207, a speech waveform synthesis unit 208, and a speech analysis-synthesis unit 209.

The communication unit 201 communicates data with the translation terminal 100 via a communication line such as the Internet.

The control unit 202 controls the speech recognition unit 203, the translation unit 204, the intention understanding unit 205, the speech waveform synthesis unit 208, and the speech analysis-synthesis unit 209, and thereby translates speech of the customer or speech of the salesperson received from the translation terminal 100, and performs speech synthesis on the translation result thereof. Furthermore, the control unit 202 understands the intention of the utterance of the customer and the utterance of the salesperson, and decides the supporting explanation and supplementary information corresponding to the utterance intention.

The speech recognition unit 203 recognizes the speech of the customer or the speech of the salesperson, and generates dialogue text. The speech recognition unit 203 generates the dialogue text by performing speech recognition on speech pertaining to a dialogue.

The translation unit 204 translates the dialogue text generated by the speech recognition unit 203 and thereby generates translated dialogue text.

The intention understanding unit 205 determines whether or not supplementary information exists on the basis of the dialogue text. The intention understanding unit 205 extracts an entity that is an explanation subject from the dialogue text of the customer or the salesperson, classifies the intention of the utterance from the dialogue text, and determines whether or not supplementary information corresponding to the entity and the intention exists. The intention of the utterance, for example, indicates whether the utterance relates to how to get to the entity or whether the utterance relates to information regarding the entity. The intention understanding unit 205 specifies explanatory text that explains the supplementary information, from the dialogue text.

The supporting explanation storage unit 206 is a nonvolatile memory, for example, and stores an explanation that is output by the translation terminal 100 as speech when the supplementary information is presented.

FIG. 3 is a drawing depicting an example of information stored in the supporting explanation storage unit 206. An explanation ID 301 is an identifier for an explanation stored in the supporting explanation storage unit 206. A supplementary information explanation 302 is explanatory text indicating an explanation that explains supplementary information. The supporting explanation storage unit 206 associates and stores the explanation ID 301 and the supplementary information explanation 302.

The supplementary information storage unit 207 is a nonvolatile memory, for example, and associates and stores the entity extracted from dialogue text of the customer or the salesperson, the utterance intention of the dialogue text, and the explanation corresponding to the entity and the utterance intention.

FIG. 4 is a drawing depicting an example of information stored in the supplementary information storage unit 207. An entity 401 is an explanation subject included in the dialogue text of the customer or the salesperson. A content ID 402 is an identifier for the entity 401. An intention ID 403 is an identifier for the utterance intention of the customer or the salesperson. For example, the intention ID "0001" corresponds to how to get to an entity, and the intention ID "0002" corresponds to information regarding the entity. An explanation ID 404 is an identifier for an explanation that is used to explain an entity. Content information 405 is an address indicating a save destination for image information that is used to explain an entity.

The speech waveform synthesis unit 208 carries out a waveform synthesis type of speech synthesis. The waveform synthesis type of speech synthesis is a technique in which speech is synthesized by concatenating pieces of prerecorded sound. The waveform synthesis type of speech synthesis has the features of generally having higher quality than an analysis-synthesis type of speech synthesis and of being close to a human voice. The speech waveform synthesis unit 208 generates translated dialogue speech by performing speech waveform synthesis on translated dialogue text obtained by translating dialogue text.

The speech analysis-synthesis unit 209 carries out an analysis-synthesis type of speech synthesis. The analysis-synthesis type of speech synthesis is a technique in which speech is synthesized by adjusting parameters such as the base frequency or tone quality. Speech generated by means of the analysis-synthesis type of speech synthesis has the feature of having a robotic sound, and is therefore not mistaken for a human voice. The speech analysis-synthesis unit 209 generates supplementary information speech by performing speech analysis and synthesis on explanatory text that explains supplementary information. The fundamental frequency of the supplementary information speech is different from the fundamental frequency of the translated dialogue speech.

In the case where it is determined that the supplementary information exists, the communication unit 201 transmits the supplementary information and translated dialogue speech to the translation terminal 100 in order to present the existence of the supplementary information to at least one person from among the plurality of people. When the supplementary information is received from the translation server 200, the response control unit 103 of the translation terminal 100 presents the existence of the supplementary information to the at least one person from among the plurality of people. The user instruction input unit 112 receives a presentation instruction for the supplementary information from the at least one person from among the plurality of people. The supplementary information presentation unit 110 presents the supplementary information in accordance with the received presentation instruction.

As mentioned above, the communication unit 201 acquires first speech of a first person (customer) who asks a question in a first language, and also acquires second speech of a second person (salesperson) who responds to the question in a second language that is different from the first language. The speech recognition unit 203 generates first dialogue text by performing speech recognition on the first speech. The translation unit 204 generates first translated dialogue text by translating the first dialogue text into the second language. The speech waveform synthesis unit 208 generates first translated dialogue speech by performing speech synthesis on the first translated dialogue text. The speech recognition unit 203 generates second dialogue text by performing speech recognition on the second speech. The translation unit 204 generates second translated dialogue text by translating the second dialogue text into the first language. The speech waveform synthesis unit 208 generates second translated dialogue speech by performing speech synthesis on the second translated dialogue text. The intention understanding unit 205 determines whether or not supplementary information exists on the basis of at least one of the first dialogue text and the second dialogue text. In the case where supplementary information exists, the supplementary information presentation determining unit 109 presents the existence of the supplementary information to at least one of the first person (customer) and the second person (salesperson).

Figure 5:
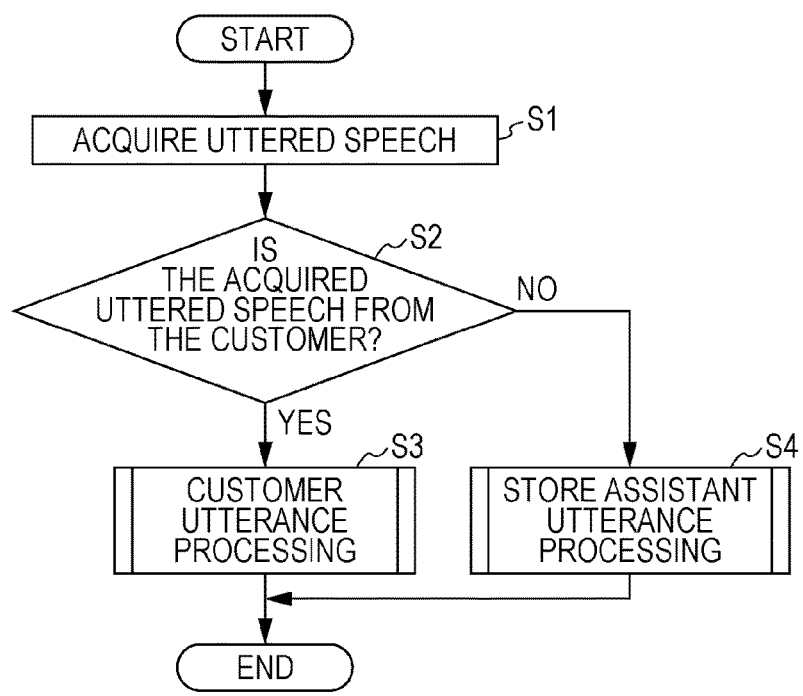
FIG. 5 is a flowchart for describing an operation of the information presentation system in the present embodiment.

FIG. 5 is a flowchart for describing an operation of the information presentation system in the present embodiment. In the present embodiment, an example will be described in which a customer and a salesperson are engaged in a dialogue. The language in which the customer speaks and the language in which the salesperson speaks are different. The information presentation system translates and then outputs an utterance of the customer as speech, and also translates and then outputs an utterance of the salesperson as speech. The operation of the information presentation system depicted in FIG. 5 starts from the customer making an utterance.

First, the speech input unit 101 of the translation terminal 100 acquires uttered speech and generates a speech signal (step S1). The customer makes an utterance to the translation terminal 100. The language in which the customer speaks and the language in which the salesperson speaks are preset or are selected by the customer or the salesperson prior to utterances being made. In addition, the format conversion unit 102 of the translation terminal 100 converts the speech signal generated by the speech input unit 101 into digital data by means of pulse-code modulation (PCM), for example, and generates a PCM speech signal.

Next, the response control unit 103 of the translation terminal 100 determines whether or not the acquired uttered speech is uttered speech of the customer (step S2). The translation terminal 100 may be provided with a customer speech input start button for receiving speech input performed by the customer, and a salesperson speech input start button for receiving speech input performed by the salesperson, for example. The user instruction input unit 112 determines which of the customer speech input start button and the salesperson speech input start button has been pressed. The response control unit 103 determines that uttered speech acquired after the customer speech input start button has been pressed is uttered speech from the customer, and determines that uttered speech acquired after the salesperson speech input start button has been pressed is uttered speech from the salesperson.

It should be noted that the translation terminal 100 may be provided with a customer speech input device that receives speech input performed by the customer, and a salesperson speech input device that receives speech input performed by the salesperson. Furthermore, the response control unit 103 may determine whether input uttered speech is uttered speech produced by the customer or is uttered speech produced by the salesperson by determining the language of the uttered speech. Furthermore, any determination method may be used for the determination method for determining whether or not acquired uttered speech is uttered speech of the customer.

In the case where it is determined that uttered speech is uttered speech of the customer (yes in step S2), customer utterance processing, which is described later on, is carried out (step S3). Furthermore, in the case where it is determined that the uttered speech is not uttered speech of the customer, in other words, in the case where it is determined that the uttered speech is uttered speech of the salesperson (no in step S2), salesperson utterance processing, which is described later on, is carried out (step S4).

Figure 6:
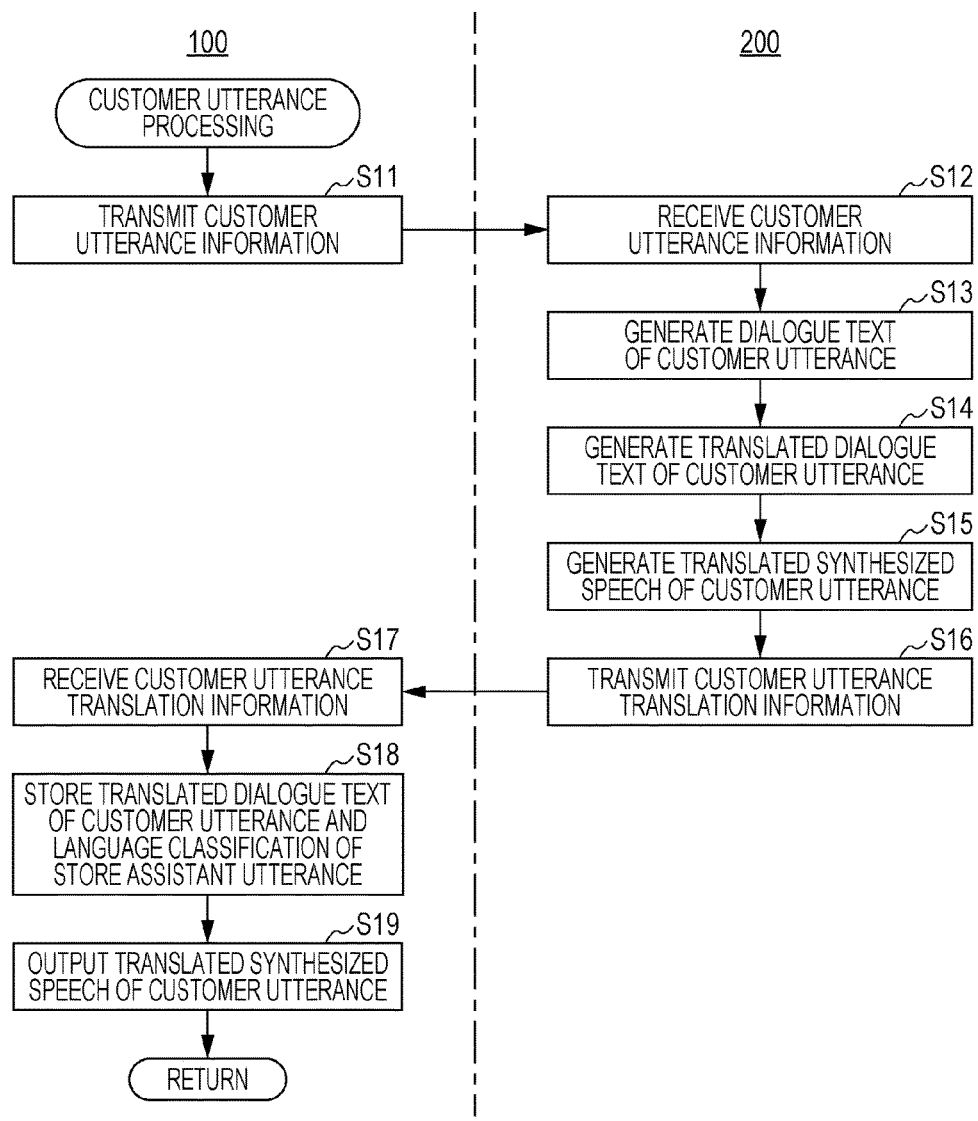
FIG. 6 is a flowchart for describing a customer utterance processing operation executed in the translation terminal and the translation server.

FIG. 6 is a flowchart for describing a customer utterance processing operation executed in the translation terminal 100 and the translation server 200. The customer utterance processing of FIG. 6 is started in the case where it is determined by the response control unit 103 of the translation terminal 100 that uttered speech is uttered speech of the customer.

First, the communication unit 104 of the translation terminal 100 transmits, to the translation server 200, customer utterance information including a PCM speech signal of the customer utterance, an identifier indicating that a customer utterance is present, a language classification of the customer utterance, and a language classification of a salesperson utterance (step S11).

Next, the communication unit 201 of the translation server 200 receives the customer utterance information transmitted by the translation terminal 100 (step S12).

Next, the speech recognition unit 203 of the translation server 200 performs speech recognition on the PCM speech signal and generates dialogue text of the customer utterance, using the received PCM speech signal of the customer utterance and the language classification of the customer utterance (step S13).

Next, the translation unit 204 of the translation server 200 translates the dialogue text in the language of the customer into the language of the salesperson and generates translated dialogue text of the customer utterance, using the generated dialogue text of the customer utterance, the language classification of the customer utterance, and the language classification of the salesperson utterance (step S14).

Next, the speech waveform synthesis unit 208 of the translation server 200 performs speech synthesis on the translated dialogue text of the customer utterance and generates translated synthesized speech of the customer utterance, using the generated translated dialogue text of the customer utterance and the language classification of the salesperson utterance (step S15).

Next, the communication unit 201 of the translation server 200 transmits, to the translation terminal 100, customer utterance translation information including the translated dialogue text of the customer utterance, the translated synthesized speech of the customer utterance, the identifier indicating that a customer utterance is present, and the language classification of the salesperson utterance (step S16).

Next, the communication unit 104 of the translation terminal 100 receives the customer utterance translation information transmitted by the translation server 200 (step S17).

Next, the response control unit 103 of the translation terminal 100 stores the received translated dialogue text of the customer utterance and the language classification of the salesperson utterance in the response retaining unit 106 (step S18).

Next, the speech output unit 105 of the translation terminal 100 outputs, as speech, the received translated synthesized speech of the customer utterance (step S19). It should be noted that when the translated synthesized speech of the customer utterance is output as speech, the video output unit 111 may display a character on a display screen and perform display control in such a way that it appears as if the character on the display screen is talking.

Figure 7:
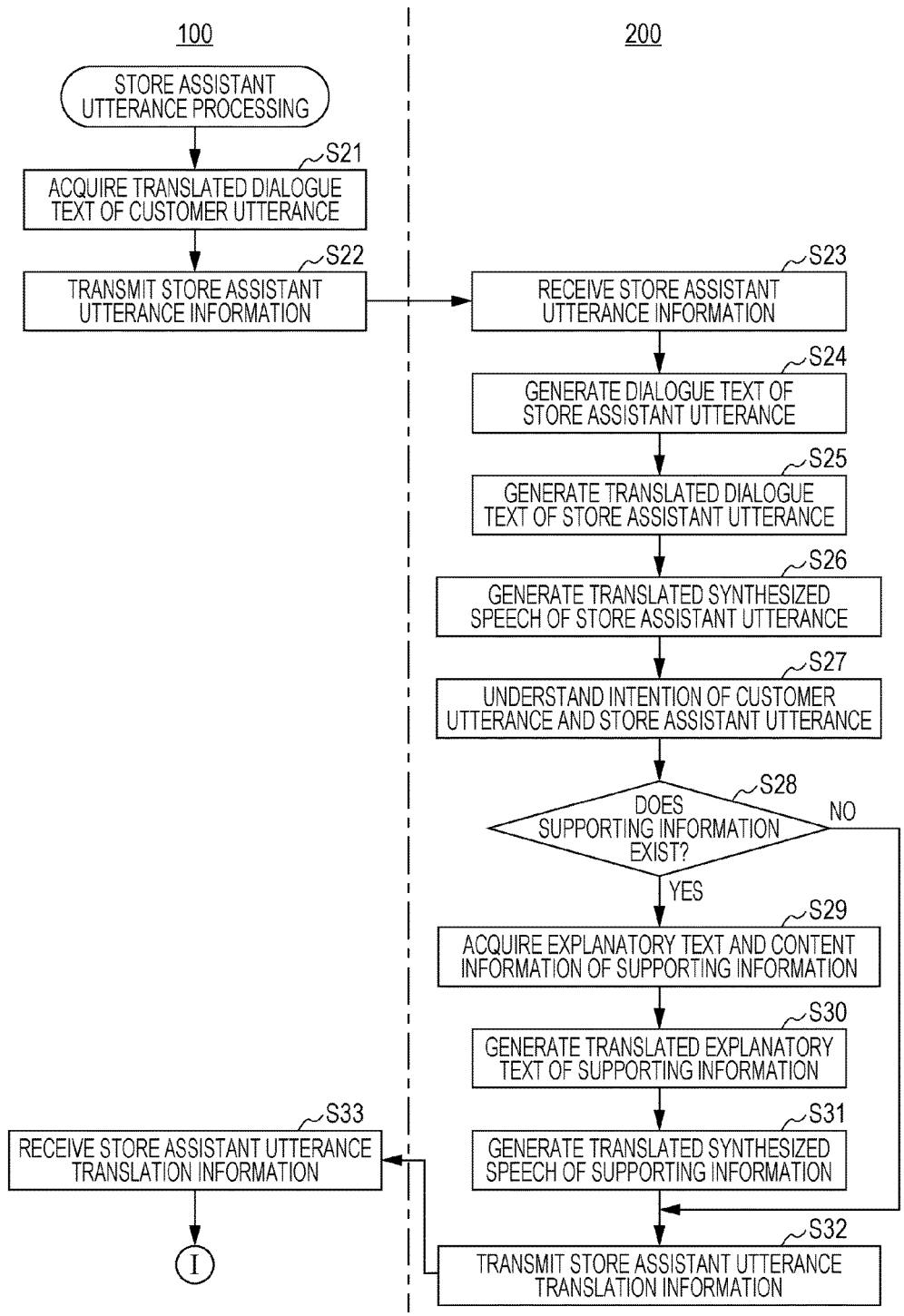
FIG. 7 is a first flowchart for describing a salesperson utterance processing operation executed in the translation terminal and the translation server.
Figure 8:
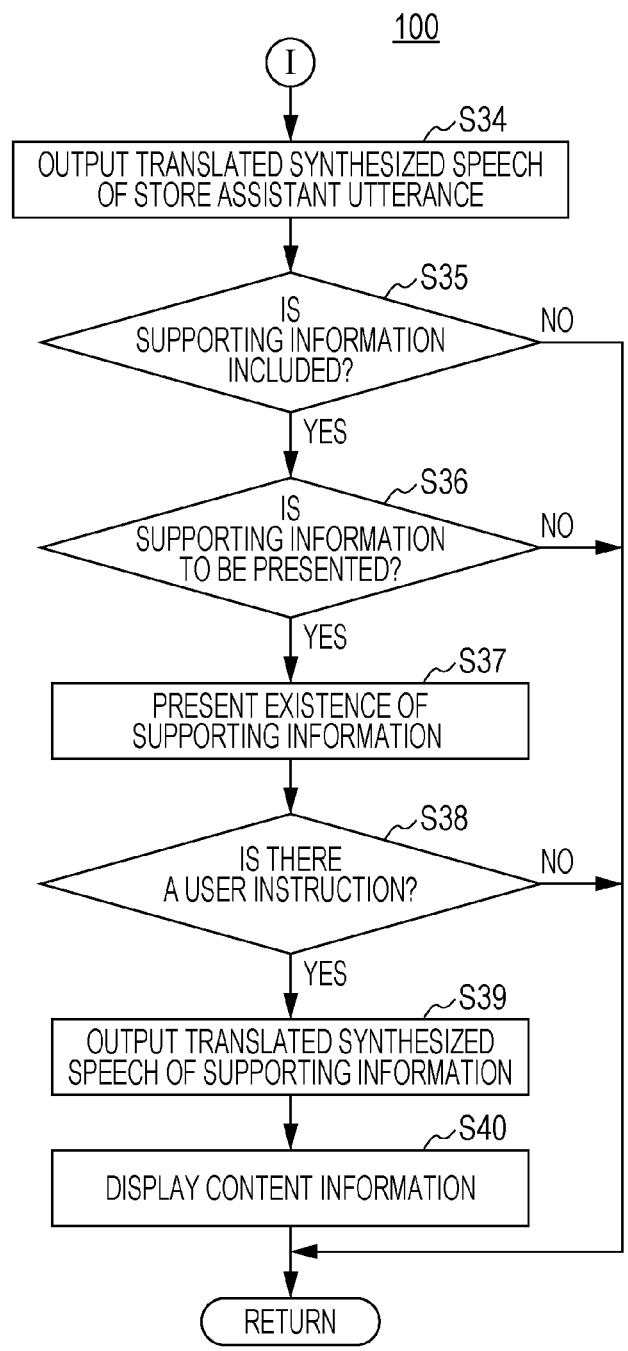
FIG. 8 is a second flowchart for describing a salesperson utterance processing operation executed in the translation terminal and the translation server.

FIG. 7 is a first flowchart for describing a salesperson utterance processing operation executed in the translation terminal 100 and the translation server 200, and FIG. 8 is a second flowchart for describing a salesperson utterance processing operation executed in the translation terminal 100 and the translation server 200. The salesperson utterance processing of FIG. 7 is started in the case where it is determined by the response control unit 103 of the translation terminal 100 that uttered speech is uttered speech of the salesperson.

First, the response control unit 103 of the translation terminal 100 acquires translated dialogue text of the customer utterance retained in the response retaining unit 106 (step S21).

Next, the communication unit 104 of the translation terminal 100 transmits, to the translation server 200, salesperson utterance information including a PCM speech signal of the salesperson utterance, an identifier indicating that a salesperson utterance is present, the language classification of the salesperson utterance, the language classification of the customer utterance, and the translated dialogue text of the customer utterance acquired from the response retaining unit 106 (step S22).

Next, the communication unit 201 of the translation server 200 receives the salesperson utterance information transmitted by the translation terminal 100 (step S23).

Next, the speech recognition unit 203 of the translation server 200 performs speech recognition on the PCM speech signal and generates dialogue text of the salesperson utterance, using the received PCM speech signal of the salesperson utterance and the language classification of the salesperson utterance (step S24).

Next, the translation unit 204 of the translation server 200 translates the dialogue text in the language of the salesperson into the language of the customer and generates translated dialogue text of the salesperson utterance, using the generated dialogue text of the salesperson utterance, the language classification of the salesperson utterance, and the language classification of the customer utterance (step S25).

Next, the speech waveform synthesis unit 208 of the translation server 200 performs speech synthesis on the translated dialogue text of the salesperson utterance and generates translated synthesized speech of the salesperson utterance, using the generated translated dialogue text of the salesperson utterance and the language classification of the customer utterance (step S26).

Next, the intention understanding unit 205 of the translation server 200 understands the intention of the customer utterance and the salesperson utterance, using the translated dialogue text of the customer utterance and the dialogue text of the salesperson utterance (step S27). In other words, the intention understanding unit 205 extracts the entity from the translated dialogue text of the customer utterance and the dialogue text of the salesperson utterance, and acquires, from the translated dialogue text of the customer utterance and the dialogue text of the salesperson utterance, an intention ID that classifies whether an utterance is asking how to get to the entity or whether the utterance is asking for information regarding the entity. For the extraction of the entity, a statistical method such as machine learning may be used, or grammatical rules may be used. Furthermore, for the classification method, a statistical method such as machine learning may be used, or a method for estimating by means of predetermined rules from expressions included in the translated dialogue text and the dialogue text may be used.

Next, the intention understanding unit 205 of the translation server 200 determines whether or not supplementary information exists, using the acquired entity and intention ID (step S28). The intention understanding unit 205 determines whether or not supplementary information exists by searching the supplementary information storage unit 207 using the entity and the intention ID. The intention understanding unit 205 determines that supplementary information exists in the case where supplementary information corresponding to the acquired entity and intention ID exists in the supplementary information storage unit 207, and determines that supplementary information does not exist in the case where supplementary information corresponding to the acquired entity and intention ID does not exist in the supplementary information storage unit 207.

Here, in the case where it is determined that supplementary information does not exist (no in step S28), processing transitions to step S32.

However, in the case where it is determined that the supplementary information exists (yes in step S28), the control unit 202 of the translation server 200 acquires content information and explanatory text of the supplementary information (step S29). The control unit 202 acquires an explanation ID corresponding to the acquired entity and intention ID from the supplementary information storage unit 207, and acquires explanatory text (an explanation) corresponding to the acquired explanation ID from the supporting explanation storage unit 206. Furthermore, the control unit 202 acquires content information corresponding to the acquired entity and intention ID from the supplementary information storage unit 207.

It should be noted that the explanatory text and content information do not always necessarily exist, and the control unit 202 may acquire only explanatory text in the case where there is no content information, and may acquire only content information in the case where there is no explanatory text.

Next, the translation unit 204 of the translation server 200 translates the explanatory text of the supplementary information into the language of the customer and generates translated explanatory text of the supplementary information, using the explanatory text of the supplementary information, the language classification of the explanatory text, and the language classification of the customer utterance (step S30).

Next, the speech analysis-synthesis unit 209 of the translation server 200 performs speech synthesis on the translated explanatory text of the supplementary information and generates translated synthesized speech of the supplementary information, using the generated translated explanatory text of the supplementary information and the language classification of the customer utterance (step S31).

Next, the communication unit 201 of the translation server 200 transmits, to the translation terminal 100, salesperson utterance translation information including the translated dialogue text of the salesperson utterance, the translated synthesized speech of the salesperson utterance, the identifier indicating that a salesperson utterance is present, the translated explanatory text, the translated synthesized speech of the supplementary information, the language classification of the customer utterance, and the content information (step S32). It should be noted that in the case where it is determined in step S28 that supplementary information does not exist, the translated explanatory text, the translated synthesized speech of the supplementary information, and the content information are not transmitted. In other words, in the case where it is determined that supplementary information does not exist, the communication unit 201 transmits, to the translation terminal 100, salesperson utterance translation information including the translated dialogue text of the salesperson utterance, the translated synthesized speech of the salesperson utterance, the identifier indicating that a salesperson utterance is present, and the language classification of the customer utterance.

Next, the communication unit 104 of the translation terminal 100 receives the salesperson utterance translation information transmitted by the translation server 200 (step S33).

Next, the speech output unit 105 of the translation terminal 100 outputs, as speech, the translated synthesized speech of the salesperson utterance included in the salesperson utterance translation information received by the communication unit 104 (step S34). It should be noted that when the translated synthesized speech of the salesperson utterance is output as speech, the video output unit 111 may display a character on the display screen and perform display control in such a way that it appears as if the character on the display screen is talking.

Next, the supplementary information presence determining unit 108 of the translation terminal 100 determines whether or not supplementary information (translated explanatory text, translated synthesized speech of the supplementary information, and content information) is included in the salesperson utterance translation information received by the communication unit 104 (step S35). Here, in the case where it is determined that supplementary information is not included (no in step S35), processing is terminated.

However, in the case where it is determined that supplementary information is included (yes in step S35), the supplementary information presentation determining unit 109 of the translation terminal 100 determines whether or not the supplementary information is to be presented, from setting information of the supplementary information presentation setting unit 107. Whether or not the supplementary information is to be presented is set in advance in the setting information. Here, in the case where it is determined that the supplementary information is not to be presented (no in step S36), processing is terminated.

However, in the case where it is determined that the supplementary information is to be presented (yes in step S36), the supplementary information presentation determining unit 109 of the translation terminal 100 presents the existence of the supplementary information to at least one of the customer and the salesperson (step S37). By presenting the existence of the supplementary information, the salesperson or the customer is able to decide whether or not the supplementary information is to be presented. In other words, in the case where presentation of the supplementary information is not necessary for the salesperson, the salesperson is able to continue the dialogue as it is with the customer without causing the supplementary information to be displayed, and in the case where presentation of the supplementary information is necessary for the salesperson, the salesperson is able to interrupt the dialogue with the customer and cause the supplementary information to be presented.

Figure 9:
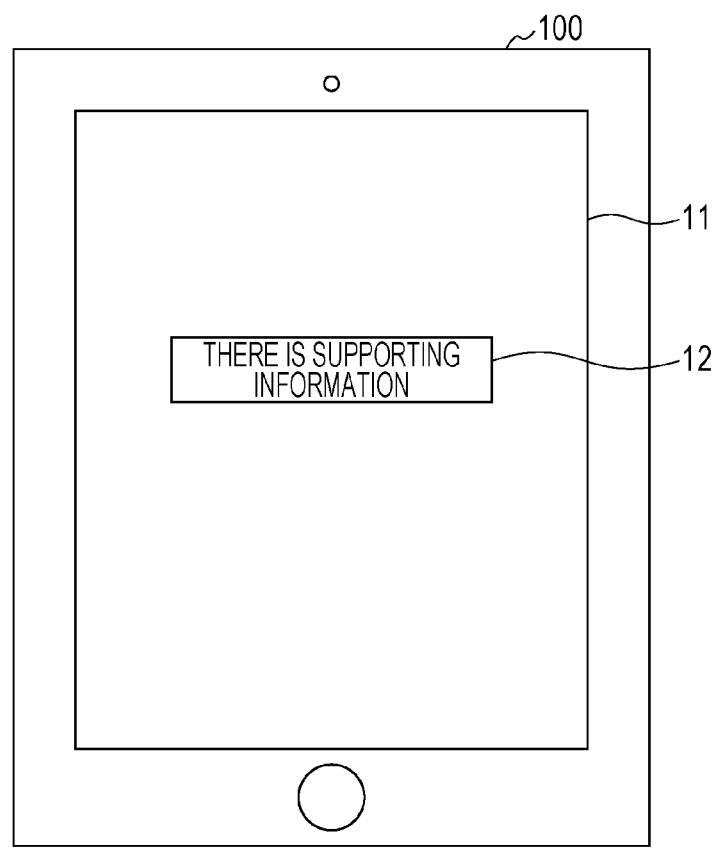
FIG. 9 is a drawing depicting an example of a screen that is displayed on the translation terminal when the existence of the supplementary information is presented.

FIG. 9 is a drawing depicting an example of a screen that is displayed on the translation terminal when the existence of the supplementary information is presented. For example, the supplementary information presentation determining unit 109 presents the existence of the supplementary information by displaying a mark 12 indicating that the supplementary information exists, on a screen 11 of the translation terminal 100.

It should be noted that the supplementary information presentation determining unit 109 may present the existence of the supplementary information by outputting, as audio, a notification sound indicating that the supplementary information exists.

Next, the supplementary information presentation determining unit 109 of the translation terminal 100 determines whether or not there is a user instruction for the supplementary information to be presented from the user instruction input unit 112 (step S38). Here, in the case where it is determined that there is no user instruction (no in step S38), processing is terminated. The user instruction input unit 112 may receive a user instruction due to the mark 12 which indicates that the supplementary information exists and is displayed on the screen 11 of the translation terminal 100 being touched. It should be noted that in the case where the mark 12 has not been touched for a predetermined time after the mark 12 has been displayed, the supplementary information presentation determining unit 109 may remove the mark 12.

It should be noted that the supplementary information presentation determining unit 109 may present the existence of the supplementary information by causing an LED provided in the translation terminal 100 to turn on or to flash. In this case, the user instruction input unit 112 may receive a user instruction due to a button provided in the translation terminal 100 being pressed. Furthermore, in the case where the button has not been pressed for a predetermined time after the LED has been turned on or made to flash, the supplementary information presentation determining unit 109 may cause the LED to turn off.

However, in the case where it is determined that there is a user instruction (yes in step S38), the supplementary information presentation unit 110 of the translation terminal 100 outputs, as speech, translated synthesized speech of the supplementary information via the speech output unit 105 (step S39).

Next, the supplementary information presentation unit 110 of the translation terminal 100 displays the content information of the supplementary information via the video output unit 111 (step S40). It should be noted that the supplementary information presentation unit 110 may output only the translated synthesized speech of the supplementary information without displaying the content information. Furthermore, the supplementary information presentation unit 110 may output only the content information without outputting the translated synthesized speech of the supplementary information.

It should be noted that in the information presentation system of the present embodiment, the intention understanding processing indicated in step S27 and the determination processing regarding whether or not the supplementary information exists indicated in step S28 are carried out according to the language of the salesperson utterance but may be carried out according to the language of the customer utterance. In such a case, the processing of step S27 and step S28 is carried out using dialogue text of the customer utterance instead of translated dialogue text of the customer utterance, and is carried out using translated dialogue text of the salesperson utterance instead of dialogue text of the salesperson utterance.

It should be noted that in the information presentation system of the present embodiment, a description is given envisaging the case where the customer and the salesperson are talking in different languages, but it is possible for the information presentation system to also be used in the case where the customer and the salesperson are talking in the same language. In such a case, the processing of steps S14, S15, and S19 of FIG. 6, steps S25 and S26 of FIG. 7, and step S34 of FIG. 8 may be omitted.

Furthermore, the translation server 200 may be provided with an utterance count storage unit that associates and stores identification information identifying the salesperson and the number of salesperson utterances. In the case where it is determined that the supplementary information exists, the control unit 202 of the translation server 200 may refer to the number of utterances and determine whether or not the number of salesperson utterances is greater than a predetermined number. In the case where the number of salesperson utterances is greater than the predetermined number, it may be determined that it is not necessary to present the supplementary information, and the existence of the supplementary information may not be presented.

Here, a specific dialogue between a customer and a salesperson will be described. For example, in the case where a customer says "I would like to send some luggage to America" in English to a salesperson who speaks Japanese, the information presentation system translates this utterance of the customer into Japanese and outputs the translated utterance as speech. The salesperson then says "We have an international courier service" in Japanese, and the information presentation system translates this utterance of the salesperson into English and outputs the translated utterance as speech. At such time, the information presentation system extracts the words "international courier service" from dialogue text of the salesperson as an entity (explanation subject), and acquires supplementary information relating to the international courier service. The information presentation system presents the existence of supplementary information to the salesperson. In the case where a presentation instruction for the supplementary information is received from the salesperson, the information presentation system outputs, as speech, the supplementary information of "The luggage that can be sent by the international courier service has a maximum size of 160 cm and a maximum weight of 25 kg".

It should be noted that the translation server 200 may be further provided with a translation count storage unit that associates and stores identification information identifying the salesperson and the number of times of having translated into the language of the customer utterance. Then, in the case where it is determined that the supplementary information exists, the control unit 202 of the translation server 200 may refer to the translation count storage unit and determine whether or not the number of times of having translated into the language of the customer utterance is greater than a predetermined number of times. In the case where the control unit 202 determines that the number of times of having translated into the language of the customer utterance is greater than the predetermined number of times, it may be determined that presentation of the supplementary information is not necessary, and the existence of the supplementary information may not be presented to the salesperson. For example, for a salesperson who has used the information presentation system a number of times that is greater than the predetermined number of times, there is a high possibility of the supplementary information being information that is already known. Therefore, in the case where the number of times of having translated into the language of the customer utterance is greater than the predetermined number of times, it may be determined that presentation of the supplementary information is not necessary, and the existence of the supplementary information may not be presented to the salesperson.

Furthermore, the translation server 200 may be further provided with a usage time storage unit that associates and stores identification information identifying the salesperson and a usage time from the salesperson starting to use the information presentation system to the present time. Then, in the case where it is determined that the supplementary information exists, the control unit 202 of the translation server 200 may refer to the usage time storage unit and determine whether or not the usage time from the salesperson starting to use the information presentation system to the present time is longer than a predetermined time. In the case where the control unit 202 determines that the usage time is longer than the predetermined time, it may be determined that presentation of the supplementary information is not necessary, and the existence of the supplementary information may not be presented to the salesperson. For example, for a salesperson who has used the information presentation system for a time that is longer than the predetermined time, there is a high possibility of the supplementary information being information that is already known. Therefore, in the case where the usage time of the information presentation system of the salesperson is longer than the predetermined time, it may be determined that presentation of the supplementary information is not necessary, and the existence of the supplementary information may not be presented to the salesperson.

Furthermore, the translation server 200 may be further provided with a presentation count storage unit that associates and stores identification information identifying the salesperson and the number of times of having presented the supplementary information corresponding to the same explanation subject (entity). Then, in the case where it is determined that the supplementary information exists, the control unit 202 of the translation server 200 may determine whether or not the number of times of having presented the supplementary information corresponding to the same explanation subject is greater than a predetermined number of times. In the case where the control unit 202 determines that the number of times of having presented the supplementary information is greater than the predetermined number of times, it may be determined that presentation of the supplementary information is not necessary, and the existence of the supplementary information may not be presented to the salesperson. For example, in the case where the supplementary information corresponds to the aforementioned explanation subject of an "international courier service", the salesperson is able to explain the international courier service without the supplementary information. Therefore, in the case where the supplementary information corresponding to a specific explanation subject has been presented a greater number of times than a predetermined number of times, it may be determined that presentation of the supplementary information is not necessary, and the existence of the supplementary information may not be presented to the salesperson.

The information presentation method, the non-transitory recording medium storing thereon a computer program, and the information presentation system according to the present disclosure are able to cause supplementary information to be presented only when a person requires the supplementary information to be presented rather than the supplementary information always being presented, are able to realize a smooth dialogue, and are useful as an information presentation method, a non-transitory recording medium storing thereon a computer program, and an information presentation system that translate speech pertaining to a dialogue between a plurality of people and present supplementary information for supporting the dialogue.

What is claimed is:

1. An information presentation method, comprising:
   performing speech recognition on speech related to a dialogue between a plurality of people to generate a dialogue text, using a processor of an information presentation system;
   translating the dialogue text to generate a translated dialogue text, using the processor;
   performing speech synthesis on the translated dialogue text to generate translated dialogue speech, using the processor;
   outputting the translated dialogue speech using a speaker of the information presentation system;
   determining whether or not supplementary information for supporting the dialogue exists based on the dialogue text, using the processor; and
   in a case where the supplementary information exists, presenting an existence of the supplementary information on a display of the information presentation system in accordance with a usage situation which indicates the at least one person of the plurality of people uses the information presentation system,
   wherein the translated dialogue speech is generated by performing speech waveform synthesis on the translated dialogue text,
   explanatory text that explains the supplementary information is specified from the dialogue text, and
   supplementary information speech is generated by performing speech analysis and synthesis on the explanatory text.

2. The information presentation method according to claim 1,
   wherein a presentation instruction for the supplementary information is received from the at least one person, and
   the supplementary information is presented in accordance with the received presentation instruction.

3. The information presentation method according to claim 2,
   wherein a fundamental frequency of the supplementary information speech is different from a fundamental frequency of the translated dialogue speech.

4. The information presentation method according to claim 1,
   wherein first speech of a first person who asks a question in a first language is acquired, and second speech of a second person who responds to the question in a second language that is different from the first language is also acquired,
   first dialogue text is generated by performing speech recognition on the first speech,
   first translated dialogue text is generated by translating the first dialogue text into the second language,
   first translated dialogue speech is generated by performing speech synthesis on the first translated dialogue text,
   second dialogue text is generated by performing speech recognition on the second speech,
   second translated dialogue text is generated by translating the second dialogue text into the first language,
   second translated dialogue speech is generated by performing speech synthesis on the second translated dialogue text,
   whether or not the supplementary information exists is determined based on at least one of the first dialogue text and the second dialogue text, and in a case where the supplementary information exists, existence of the supplementary information is presented to at least one of the first person and the second person in accordance with the usage situation of the information presentation system of the second person.

5. The information presentation method according to claim 4,
wherein the usage situation includes a number of times of having translated into the first language,
in a case where the supplementary information exists, it is determined whether or not the number of times of having translated into the first language is greater than a predetermined number of times, and
in a case where it is determined that the number of times of having translated into the first language is greater than the predetermined number of times, the existence of the supplementary information is not presented to the second person.

6. The information presentation method according to claim 4,
wherein the usage situation includes a usage time from the second person starting to use the information presentation system to a present time,
in a case where the supplementary information exists, it is determined whether or not the usage time is longer than a predetermined time, and
in a case where it is determined that the usage time is longer than the predetermined time, the existence of the supplementary information is not presented to the second person.

7. The information presentation method according to claim 4,
wherein the supplementary information includes information explaining an explanation subject,
the usage situation includes a number of times of having presented the supplementary information corresponding to the same explanation subject,
in a case where the supplementary information exists, it is determined whether or not the number of times of having presented the supplementary information is greater than a predetermined number of times, and
in a case where it is determined that the number of times of having presented the supplementary information is greater than the predetermined number of times, the existence of the supplementary information is not presented to the second person.

8. A non-transitory recording medium storing thereon a computer program, which when executed by a processor, causes the processor to perform operations comprising:
performing speech recognition on speech related to a dialogue between a plurality of people to generate a dialogue text;
translating the dialogue text to generate a translated dialogue text;
performing speech synthesis on the translated dialogue text to generate translated dialogue speech;
determining whether or not supplementary information for supporting the dialogue exists based on the dialogue text; and
in a case where it is determined that the supplementary information exists, transmitting the supplementary information and the translated dialogue speech to a terminal of at least one person of the plurality of people, in accordance with a usage situation which indicates the at least one person uses the terminal
wherein the translated dialogue speech is generated by performing speech waveform synthesis on the translated dialogue text,
explanatory text that explains the supplementary information is specified from the dialogue text, and
supplementary information speech is generated by performing speech analysis and synthesis on the explanatory text.

9. An information presentation system, comprising:
a terminal; and
a server that is connected to the terminal via an Internet,
wherein the terminal includes
a speaker;
a display;
a first processor; and
a first memory storing thereon a first computer program, which when executed by the first processor, causes the first processor to perform first operations, including
acquiring speech related to a dialogue between a plurality of people; and
transmitting the acquired speech to the server, and
wherein the server includes
a second processor; and
a second memory storing thereon a second computer program, which when executed by the second processor, causes the second processor to perform second operations, including
receiving the speech;
performing speech recognition on the speech related to the dialogue to generate a dialogue text;
translating the dialogue text to generate a translated dialogue text;
performing speech synthesis on the translated dialogue text to generate translated dialogue speech;
determining whether or not supplementary information for supporting the dialogue exists, based on the dialogue text; and
in a case where it is determined that the supplementary information exists, transmitting the supplementary information and the translated dialogue speech to the terminal of at least one person of the plurality of people, in accordance with a usage situation which indicates the at least one person uses the terminal,
wherein the translated dialogue speech is generated by performing speech waveform synthesis on the translated dialogue text,
explanatory text that explains the supplementary information is specified from the dialogue text, and
supplementary information speech is generated by performing speech analysis and synthesis on the explanatory text;
the first operations further including
receiving the supplementary information and the translated dialogue speech;
outputting the translated dialogue speech using the speaker; and
presenting an existence of the supplementary information on a display of the terminal.

* * * * *